(12) United States Patent
Lee et al.

(10) Patent No.: US 8,819,407 B2
(45) Date of Patent: Aug. 26, 2014

(54) PERSONAL MESSAGING SECURITY

(75) Inventors: Woo Beum Lee, Basking Ridge, NJ (US); Arvind Basra, Glen Ridge, NJ (US)

(73) Assignees: Verizon New Jersey Inc., Newark, NJ (US); Cellco Partnership, Basking Ridge, NJ (US)

( * ) Notice: Subject to any disclaimer, the term of this patent is extended or adjusted under 35 U.S.C. 154(b) by 126 days.

(21) Appl. No.: 13/245,086

(22) Filed: Sep. 26, 2011

(65) Prior Publication Data

US 2013/0080763 A1   Mar. 28, 2013

(51) Int. Cl.
*H04L 9/08* (2006.01)
(52) U.S. Cl.
USPC ......................................................... 713/150
(58) Field of Classification Search
USPC ......................................................... 713/150
See application file for complete search history.

(56) References Cited

U.S. PATENT DOCUMENTS

| | | | |
|---|---|---|---|
| 6,084,969 A * | 7/2000 | Wright et al. ................. | 380/271 |
| 7,647,641 B2 * | 1/2010 | Dubroeucq et al. ............ | 726/27 |
| 7,913,261 B2 * | 3/2011 | Mitchell et al. ............... | 719/310 |
| 8,301,889 B1 * | 10/2012 | Pauker et al. ................. | 713/171 |
| 2004/0120526 A1 * | 6/2004 | Hamberg ...................... | 380/277 |
| 2005/0246533 A1 * | 11/2005 | Gentry .......................... | 713/170 |
| 2006/0168445 A1 * | 7/2006 | Pitsos ........................... | 713/162 |
| 2006/0236098 A1 * | 10/2006 | Gantman et al. .............. | 713/158 |
| 2006/0242411 A1 * | 10/2006 | Lin ................................ | 713/171 |
| 2008/0141372 A1 * | 6/2008 | Massey et al. ................. | 726/23 |
| 2009/0286514 A1 * | 11/2009 | Lichorowic et al. ........ | 455/412.2 |
| 2011/0167250 A1 * | 7/2011 | Dicks et al. ....................... | 713/2 |
| 2011/0167264 A1 * | 7/2011 | Takahashi et al. ............ | 713/168 |
| 2012/0204032 A1 * | 8/2012 | Wilkins et al. ................ | 713/170 |
| 2013/0067012 A1 * | 3/2013 | Matzkel et al. ............... | 709/206 |

\* cited by examiner

*Primary Examiner* — Techane Gergiso

(57) ABSTRACT

A method may include creating, by a user device, an electronic message, the electronic message comprising destination information corresponding to an intended recipient of the electronic message. The method many include receiving, by the user device and from a user, a security key corresponding to a particular type of user input and corresponding to the intended recipient of the electronic message. The method may include encrypting, by the user device, the electronic message based on the security key, and the method may include communicating, by the user device, the electronic message based on the destination information corresponding to the intended recipient.

20 Claims, 9 Drawing Sheets

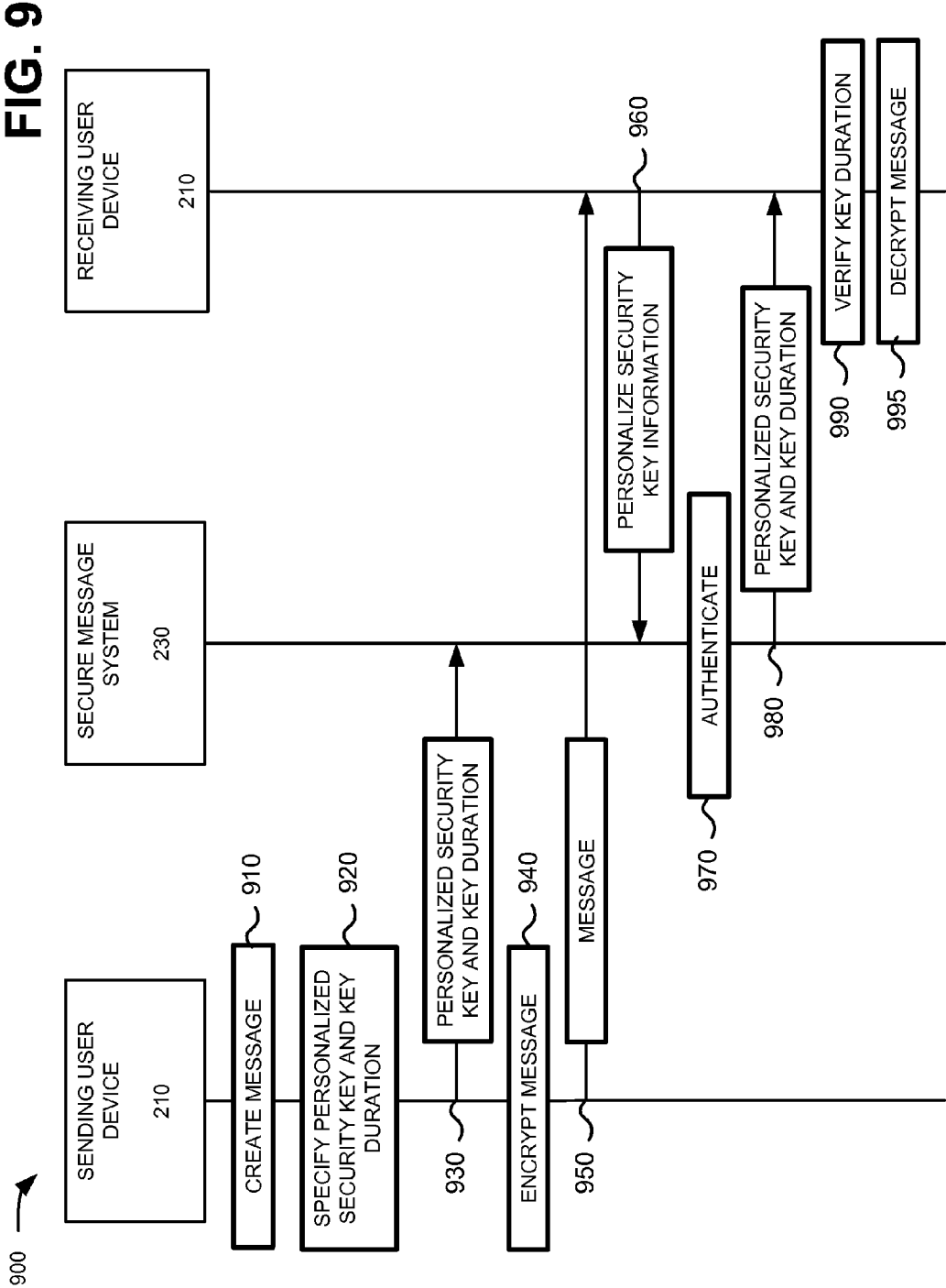

PERSONAL MESSAGING SECURITY

BACKGROUND

Electronic communications continue to be a more and more pervasive component of modern society. Examples of such electronic communications include e-mail messages, text messages, instant messages, voicemails, video messages, and other types of personal communications. However, currently available technologies do not provide adequate solutions for ensuring that electronic communications remain secure.

BRIEF DESCRIPTION OF THE DRAWINGS

FIG. 9 is a diagram of an example process for communicating an electronic message according to one or more implementations described herein.

DETAILED DESCRIPTION OF PREFERRED EMBODIMENTS

The following detailed description refers to the accompanying drawings. The same labels and/or reference numbers in different drawings may identify the same or similar elements.

In one or more implementations, described herein, devices may be used to provide enhanced security solutions for electronic messages.

Figure 1:
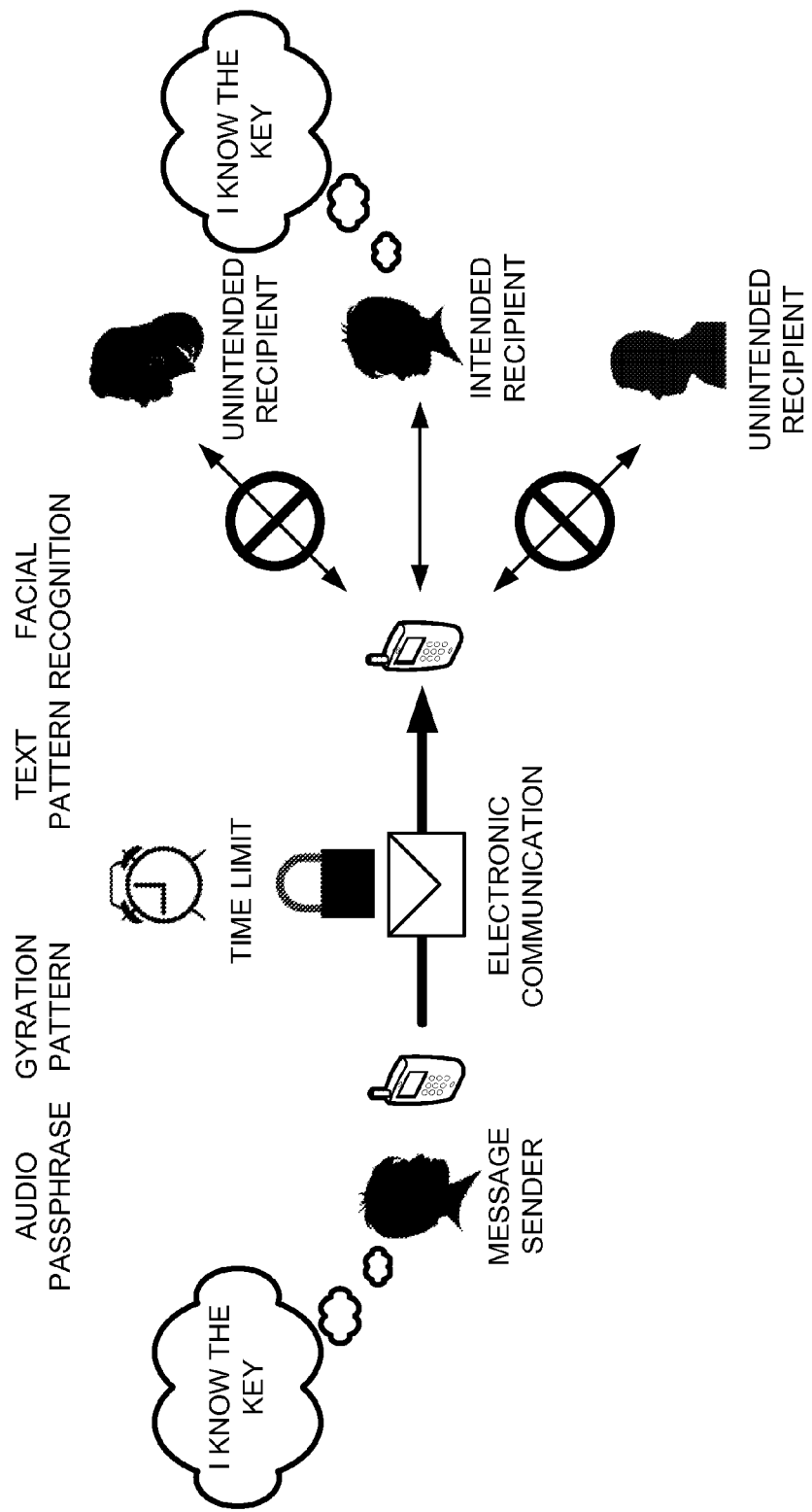
FIG. 1 is a diagram of an example overview of an implementation described herein.

FIG. 1 is a diagram of an example overview of an implementation described herein. As depicted in FIG. 1, a user may operate a user device (e.g., a mobile telephone, a personal computer, etc.) to create an e-mail, a text message, or another type of electronic message. Prior to sending the electronic message to an intended recipient, the user may implement one or more security measures to ensure that the electronic message is not seen or accessed by an unintended recipient. For example, the user may create a personalized security key (also referred to herein as "security key") that may be used to encrypt the electronic message. The personalized security key may also be used by the intended recipient to decrypt the electronic message.

The personalized security key may be created by one or more of a variety of user inputs. For instance, the personalized security key may be created by a user moving or gyrating the user device in a particular pattern, the user speaking into a microphone of the user device, the user typing a sequence of characters into a keyboard of the user device, etc. Additionally, or alternatively, the personalized security key may be personalized in the sense that only the user sending the message and the intended recipient would know, or could access, the personalized security key. For example, prior to the user sending the electronic message, the user and the intended recipient may have agreed that electronic communications between the user and the intended recipient would be encrypted and decrypted by a personalized security key created by gyrating a user device in a circular pattern.

In addition to the personalized security key, the user may impose time limits for viewing the electronic communication. For example, the user may specify that the personalized security key used to encrypt the electronic message will only be valid for decrypting the electronic message for a particular period of time (e.g., the next thirty minutes). In such a scenario, even if the intended recipient knew or had access to the personalized security key, the intended recipient may not be able to access the contents of the electronic message once the specified time period for accessing the electronic message had expired.

Accordingly, an implementation, described herein, may provide multiple solutions for enhancing the security of electronic messages. For instance, an implementation, described herein, may enable users to encrypt electronic messages using security keys that may correspond to a particular type of user input (e.g., user device gyrations, audio inputs, etc.). Additionally, or alternatively, an implementation, described herein, may enable users to specify the actual content of the security key (e.g., a particular gyration pattern, a particular phrase or word, etc.). In addition, an implementation, described herein, may enable users to impose timing constraints on decrypting or viewing the contents of an electronic message. As a result, even if an individual, other than the intended recipient, were to have physical possession of the intended recipient's user device, the individual would not be able to obtain access to the contents of the electronic message.

Figure 2:
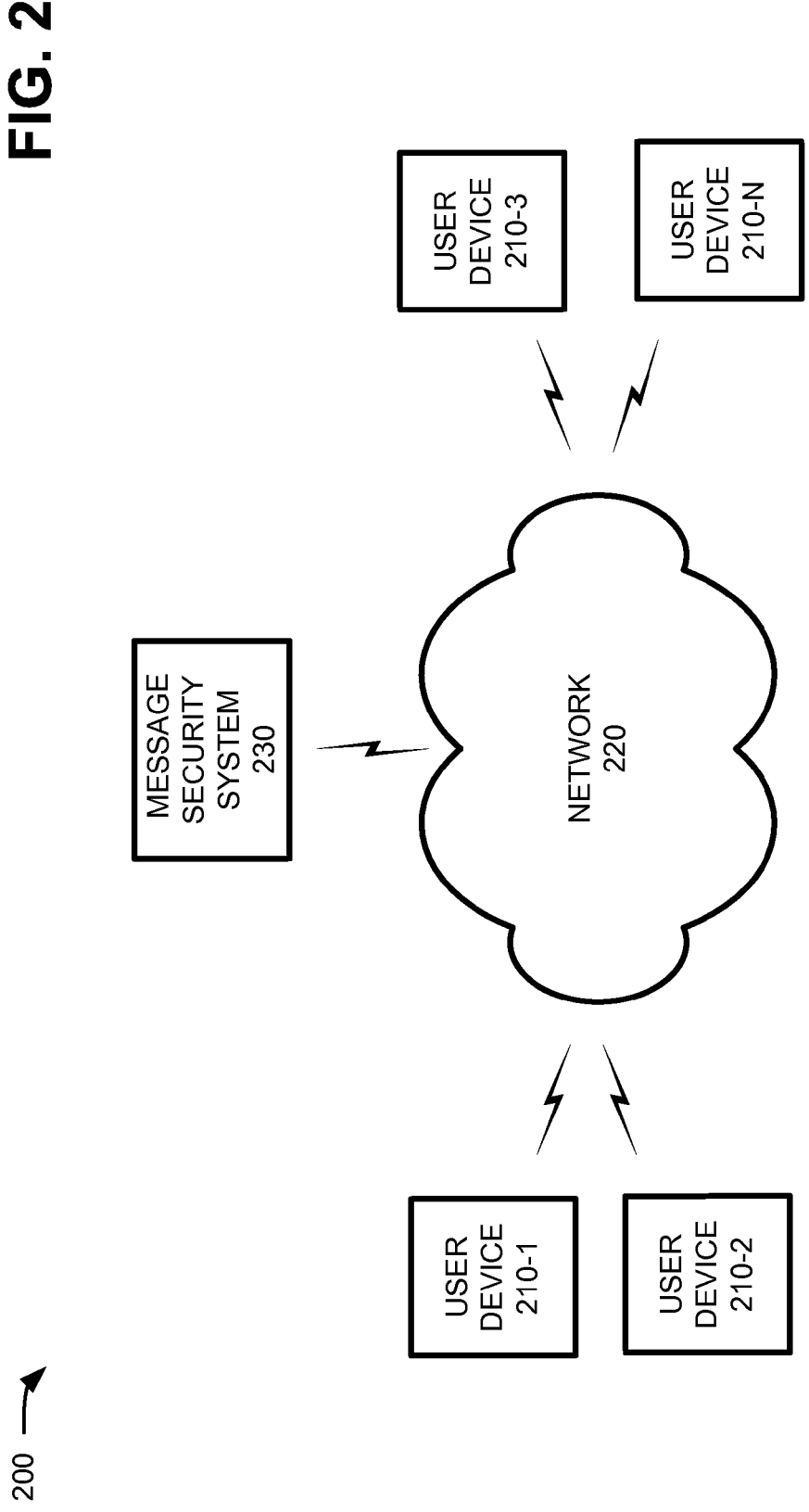
FIG. 2 is a diagram of an example environment in which systems and/or methods, described herein, may be implemented.

FIG. 2 is a diagram of an example environment 200 in which systems and/or methods, described herein, may be implemented. As depicted, environment 200 may include user devices 210-1, 210-2, 210-3, . . . , 210-N (where N≥1) (hereinafter referred to collectively as "user devices 210," and individually as "user device 210"), network 220, and message security system 230.

User device 210 may include one or more of a variety of devices capable of network communications. For example, user device 110 may include a telephone, a smart phone, a laptop computer, a tablet computer, a desktop computer, or another type of computing or communication device. User device 210 may be capable of operating in accordance with the systems, devices, processes, operations, and technical environments described herein. For instance, user device 210 may be capable of communicating with other user devices 210, message security system 230, or other devices that may be associated with network 220.

For example, user device 210 may be capable of creating electronic messages, associating the electronic messages with personalized security keys, imposing key durations on the electronic messages or the personalized security keys, and communicating the electronic messages to one or more other user devices 210. Additionally, or alternatively, user device 210 may be capable of receiving electronic messages, obtaining personalized security keys based on personalized security key information (also referred to herein as "security key information") received from a user, and use the personalized security keys to decode the electronic messages. Additional, or alternative, features, operations, and/or characteristics that may correspond to user device 210 are discussed throughout this description.

Network 220 may include any type of network or combination of networks. For example, network 220 may include a local area network (LAN) (e.g., an Ethernet network), a wireless LAN (WLAN) (e.g., an IEEE 802.11 network), a wide area network (WAN) (e.g., the Internet), or a wireless WAN (WWAN) (e.g., a Long-Term Evolution (LTE) network, a High-Speed Packet Access (HSPA) network, an Evolved High Rate Packet Data (eHRPD) network, etc.). Network 220 may also, or alternatively, include an IMS network, a fiber optic (e.g., a fiber optic service (FiOS)) network, a voice over Internet Protocol (VoIP) network, a metropolitan area network (MAN), an ad hoc network, or a telephone network (e.g., a Public Switched Telephone Network (PSTN)). As such, depending on the implementation, network 220 may provide one or more of a variety of services and/or technological capabilities with respect to user devices 210 and message security system 230.

Message security system 230 may include one or more of a variety of computing devices. For example, message security system 230 may include a server, a cluster of servers, or one or more other types of computing or communication devices. Additionally, or alternatively, message security system 230 may operate in one or more of a variety of network capacities (e.g., a database server, a file server, an e-mail server, an application server, etc.).

Additionally, or alternatively, message security system 230 may participate in, enable, or facilitate electronic message security as described herein. For example, message security system 230 may provide user devices 210 with software for performing one or more of the operations described herein. Message security system 230 may also, or alternatively, enable user devices 210 to register with message security system 230 in order to send and/or receive secured electronic messages as described herein. Additionally, or alternatively, message security system 230 may provide a repository for electronic messages and/or personalized security keys as described herein.

While FIG. 2 shows a particular number and arrangement of devices, in practice, environment 200 may include additional devices, fewer devices, different devices, or differently arranged devices than are shown in FIG. 2. Also, although certain connections are shown in FIG. 2, these connections are simply examples and additional or different connections may exist in practice. Each of the connections may be a wired and/or wireless connection. Further, each device may be implemented as multiple, possibly distributed, devices.

Figure 3:
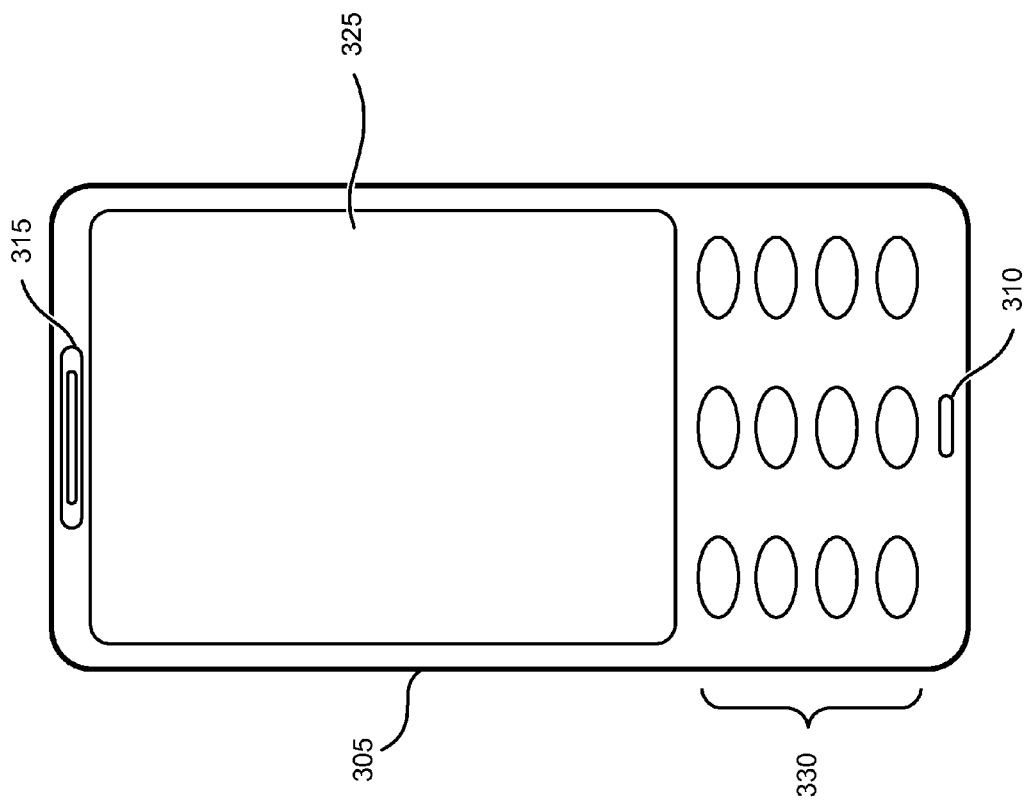
FIG. 3 is a diagram of an example user device.

FIG. 3 is a diagram of an example user device 210. As illustrated in FIG. 3, user device 210 may include a housing 305, a microphone 310, a speaker 315, a keypad 320, and a display 325.

Housing 305 may include a structure to contain components of user device 210. For example, housing 305 may be formed from plastic, metal, or some other material. Housing 305 may support microphone 310, speakers 315, keypad 320, and display 325.

Microphone 310 may include an input device that converts a sound wave to a corresponding electrical signal. For example, the user may speak into microphone 310 during a telephone call or to execute a voice command. Speaker 315 may include an output device that converts an electrical signal to a corresponding sound wave. For example, the user may listen to music, listen to a calling party, or listen to other auditory signals through speaker 315.

Keypad 320 may include an input device that provides input into user device 210. Keypad 320 may include a standard telephone keypad, a QWERTY keyboard, and/or some other type or arrangement of keys. Keypad 320 may also include one or more special purpose keys. The user may utilize keypad 320 as an input component to user device 210. For example, the user may use keypad 320 to enter information, such as alphanumeric text, to access data, or to invoke a function or an operation.

Display 325 may include an output device that outputs visual content, and/or may include an input device that receives user input (e.g., a touch screen (also known as a touch display)). Display 325 may be implemented according to a variety of display technologies, such as, a liquid crystal display (LCD), a plasma display panel (PDP), a field emission display (FED), a thin film transistor (TFT) display, or some other type of display technology. Additionally, display 325 may be implemented according to a variety of sensing technologies, such as, capacitive sensing, surface acoustic wave sensing, resistive sensing, optical sensing, pressure sensing, infrared sensing, gesture sensing, etc. Display 325 may display text, images, and/or video to the user. Display 325 may also display a user interface (e.g., a graphical user interface (GUI)) of user device 210 or a user interface of some other device which user device 210 controls, a user interface associated with applications, or the like.

Although FIG. 3 shows example components of user device 210, in other implementations, user device 210 may contain fewer components, different components, differently arranged components, or additional components than depicted in FIG. 3. For example, in some implementations, user device 210 may include a camera or another type of optical sensor. Alternatively, or additionally, one or more components of user device 210 may perform one or more other tasks described as being performed by one or more other components of user device 210.

Figure 4:
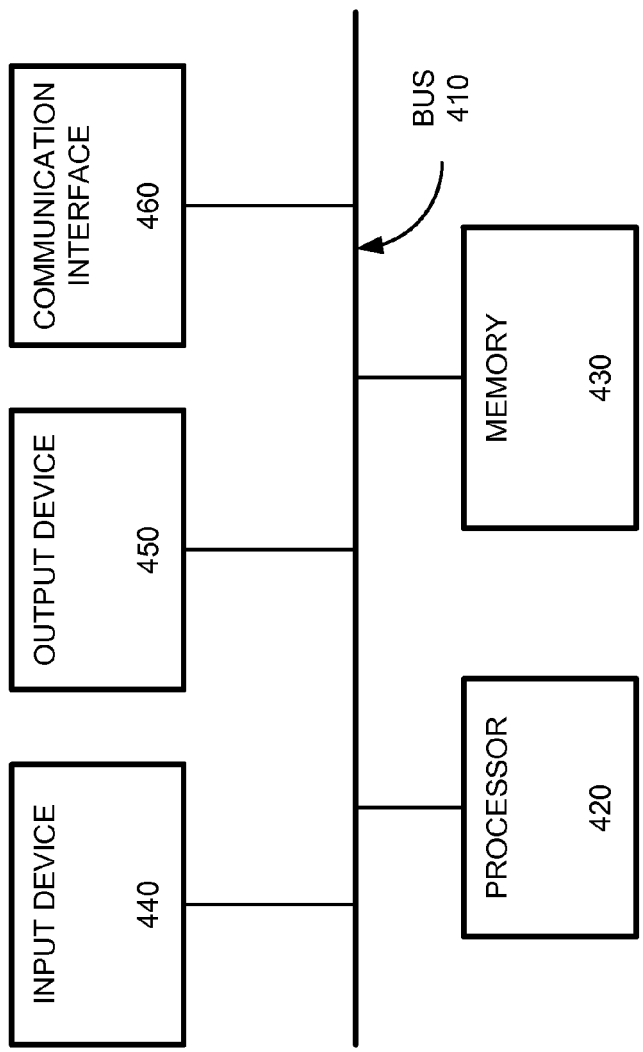
FIG. 4 is a diagram of example components of a device according to one or more implementations described herein.

FIG. 4 is a diagram of example components of a device 400 according to one or more implementations described herein. In certain implementations, device 400 may correspond to one or more of the devices depicted in FIG. 2. For example, device 400 may correspond to user device 210 and/or message security system 230. Additionally, each of user device 210 and/or message security system 230 may include one or more devices 400 or one or more components of device 400.

As depicted, device 400 may include bus 410, processor 420, memory 430, input device 440, output device 450, and communication interface 460. However, in other implementations, device 400 may include fewer components, additional components, different components, or differently arranged components than those illustrated in FIG. 4.

Bus 410 may include one or more component subsystems and/or communication paths that enable communication among the components of device 400. Processor 420 may include one or more processors, microprocessors, data processors, co-processors, network processors, application-specific integrated circuits (ASICs), controllers, programmable logic devices (PLDs), chipsets, field-programmable gate arrays (FPGAs), or other types of components that may interpret or execute instructions or data. Processor 420 may control the overall operation, or a portion thereof, of device 400, based on, for example, an operating system, and/or various applications. Processor 420 may access instructions from memory 430, from other components of device 400, or from a source external to device 400 (e.g., a network or another device).

Memory 430 may include memory and/or secondary storage. For example, memory 430 may include random access memory (RAM), dynamic RAM (DRAM), read-only memory (ROM), programmable ROM (PROM), flash memory, or some other type of memory. Memory 430 may include a hard disk (e.g., a magnetic disk, an optical disk, a magneto-optic disk, a solid state disk, etc.) or some other type of computer-readable medium, along with a corresponding drive. A computer-readable medium may be defined as a non-transitory memory device. A memory device may include space within a single physical memory device or spread across multiple physical memory devices.

Input device 440 may include one or more components that permit a user to input information into device 400. For example, input device 440 may include a keypad, a button, a switch, a knob, fingerprint recognition logic, retinal scan logic, a web cam, voice recognition logic, a touchpad, an input port, a microphone, a display, or some other type of input component. Output device 450 may include one or more components that permit device 400 to output information to a user. For example, output device 450 may include a display, light-emitting diodes (LEDs), an output port, a speaker, or some other type of output component.

Communication interface 460 may include one or more components that permit device 400 to communicate with other devices or networks. For example, communication interface 460 may include some type of wireless or wired interface. Communication interface 430 may also include an antenna (or a set of antennas) that permit wireless communication, such as the transmission and reception of radio frequency (RF) signals.

As described herein, device 400 may perform certain operations in response to processor 420 executing software instructions contained in a computer-readable medium, such as memory 430. The software instructions may be read into memory 430 from another computer-readable medium or from another device via communication interface 460. The software instructions contained in memory 430 may cause processor 420 to perform one or more processes described herein. Alternatively, hardwired circuitry may be used in place of, or in combination with, software instructions to implement processes described herein. Thus, implementations described herein are not limited to any specific combination of hardware circuitry and software.

Figure 5:
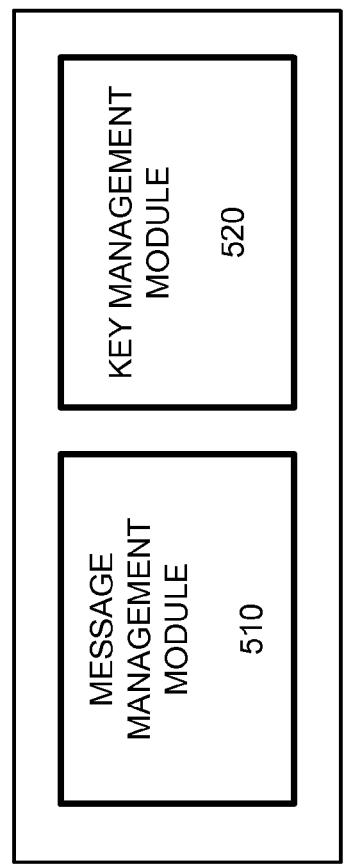
FIG. 5 is a diagram of example functional components of a user device according to one or more implementations described herein.

FIG. 5 is a diagram of example functional components of user device 210 according to one or more implementations described herein. As illustrated, user device 210 may include message management module 510 and key management module 520. Depending on the implementation, one or more of modules 510-520 may be implemented as a combination of hardware and software based on the components illustrated and described with respect to FIG. 4. Alternatively, modules 510-520 may each be implemented as hardware based on the components illustrated and described with respect to FIG. 4.

Message management module 510 may provide functionality with respect to electronic messages. For example, message management module 510 may enable user device 210 to create electronic messages, associate personalized security keys with electronic messages, encrypt electronic messages based on personalized security keys, and/or communicate electronic message to devices of intended recipients. Message management module 510 may also, or alternatively, enable user device 210 to receive electronic messages and/or decrypt electronic messages using personalized security keys. Additionally, or alternatively, message management module 510 may enable user device 210 to perform one or more other functions or operations, such as prohibiting a personalized security key from being used to decrypt an electronic message if a key duration associated with the personalized security key has expired.

Key management module 520 may provide functionality with respect to personalized security keys. For example, key management module 520 may enable user device 210 to receive personalized security keys from users, receive key durations from users, and/or associate personalized security keys with key durations. Additionally, or alternatively, key management module 520 may enable user device 210 to prompt users to input personalized security key information and/or use personalized security key information to obtain personalized security keys. Key management module 520 may enable user device 210 to perform one or more additional, or alternative, functions or operations, such as determine whether a key duration associated with a personalized security key has expired and, if so, prohibit the personalized security key to be used to decrypt a corresponding electrical message.

In addition to the functionality described above, functional components of user device 210 may also, or alternatively, provide functionality as described elsewhere in this specification. Additionally, or alternatively, as described below, one or more of the functions or operations of user device 210 may be performed by another device, such as message security system 230. Further, while FIG. 4 shows a particular number and arrangement of modules, in alternative implementations, user device 210 may include additional modules, fewer modules, different modules, or differently arranged modules than those depicted.

Figure 6:
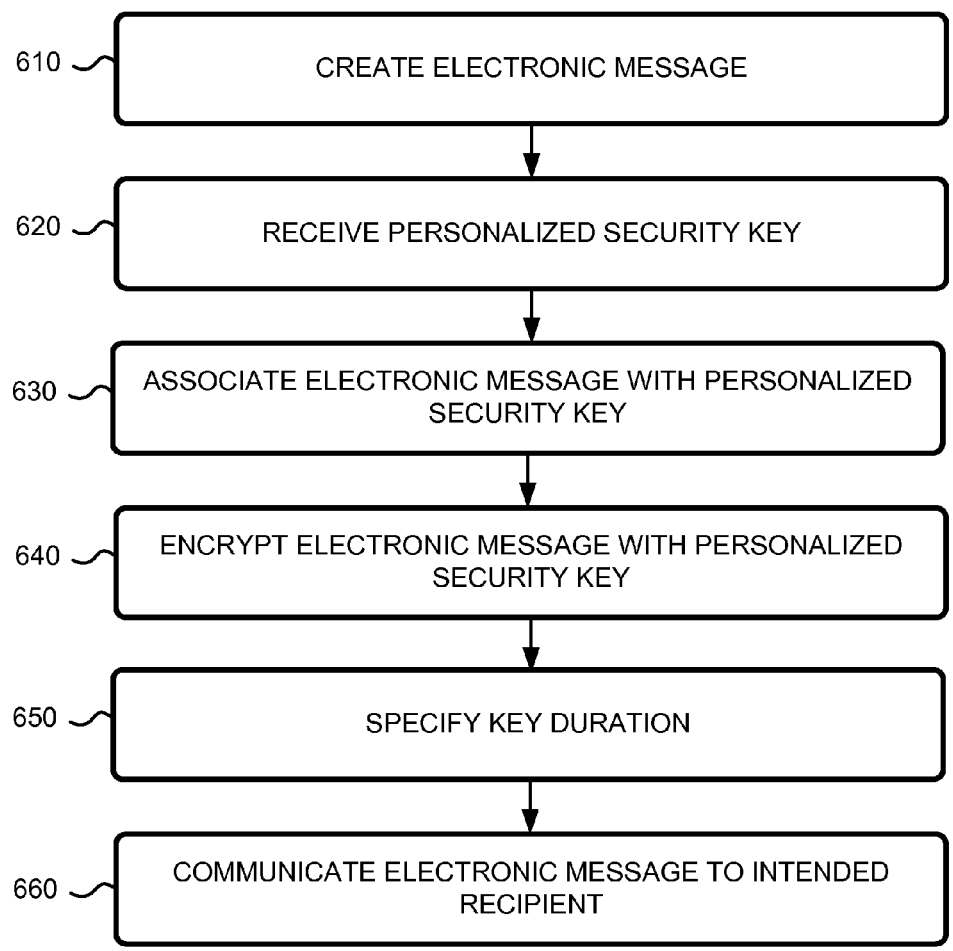
FIG. 6 is a diagram of an example process for creating and communicating an electronic message according to one or more implementations described herein.

FIG. 6 is a diagram of an example process 600 for creating and communicating an electronic message according to one or more implementations described herein. In one or more implementations, process 600 may be performed by one or more components of user device 210. In other implementations, some or all of process 600 may be performed by one or more other components/devices, or a group of components/devices, including or excluding user device 210. For example, message security system 230 may perform some or all of process 600.

An electronic message may be created (block 610). For example, user device 210 may create an electronic message. As mentioned above, examples of an electronic message may include an e-mail message, a text message, an instant message, a voicemail message, a video-mail message, or another type of electronic message. In some implementations, user device 210 may create the electronic message in response to one or more inputs or commands received from a user of user device 210.

A personalized security key may be received (block 620). For instance, user device 210 may receive a personalized security key from a user. The personalized security key may correspond to one or more security key types (e.g., an audio passphrase, a user device gyration pattern, a text pattern, a visual pattern (e.g., facial recognition), etc.). In some implementations, user device 210 may provide an array, a list, or a menu of security key types, and prompt the user to select one or more of the security key types. This may notify user device 210 to focus on one or more types of user inputs in order to receive the personalized security key. For example, the user may select a user device gyration pattern as the security key type, and user device 210 may treat a subsequent gyration pattern experienced by user device 210 as the personalized security key. As such, one or more of the implementations described herein provide solutions for enabling a user to personalize a security key by selecting a particular security key type, and, in turn, further personalize the security key by enabling the user to enter the actual key information.

The personalized security key may be associated with the electronic message (block 630). For example, user device 210 may associate the personalized security key received from the user with the electronic message. In some implementations, user device 210 may locally store the personalized security key. In other implementations, user device 210 may also, or alternatively, communicate the personalized security key to message security system 230. In such implementations, as discussed in greater detail below, a receiving user device 210 (e.g., the user device of an intended recipient) may obtain the personalized security key corresponding to the electronic message by communicating with message security system 230.

The electronic message may be encrypted with the personalized security key (block 640). For instance, user device 210 may operate to encrypt the electronic message using the personalized security key. As discussed below, the personalized security key may later be used by a receiving user device 210 to decrypt the electronic message. As such, the electronic message may be encrypted by a security key that was derived from a particular input from the user sending the electronic message.

A key duration may be specified for the personalized security key (block 650). For example, user device 210 may receive a key duration, corresponding to the personalized security key, from the user. As mentioned above, the key duration may include an interval of time, specified by the user, during which the personalized security key may be used to decrypt the electronic message. As such, attempts to decrypt the electronic message prior to, or subsequent to, the interval of time corresponding to the key duration may be prohibited or otherwise unsuccessful. As such, one or more of the implementations described herein may enable a user to further protect the electronic message by imposing time constraints on when the personalized security key may be used to decrypt the electronic message.

The electronic message may be communicated to an intended recipient (block 660). For example, user device 210 may communicate the electronic message to an intended recipient (e.g., to the user device of the intended recipient). In some implementations, user device 210 may communicate the electronic message to another user device 210 via network 220. In another implementation, user device 210 may communicate the electronic message to another user device 210 via message security system 230

While FIG. 6 shows a flowchart diagram of an example process 600 for creating and communicating an electronic message, in other implementations, a process for creating and communicating an electronic message may include fewer operations, different operations, differently arranged operations, or additional operations than depicted in FIG. 6.

Figure 7:
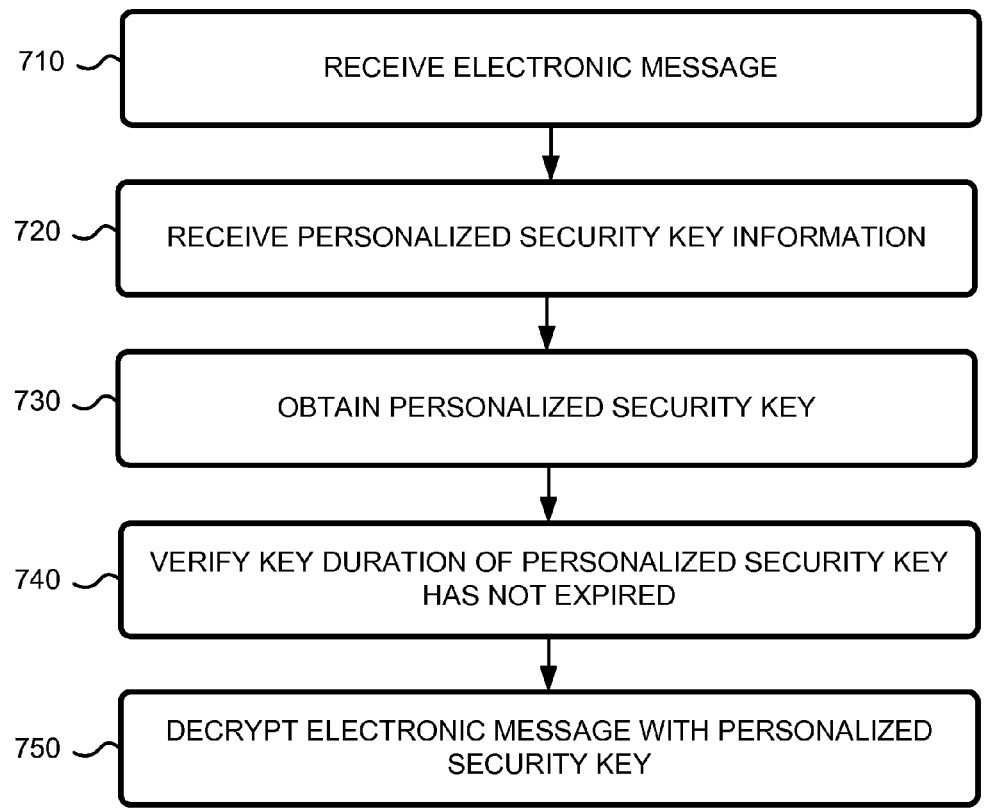
FIG. 7 is a diagram of an example process for decrypting an electronic message according to one or more implementations described herein.

FIG. 7 is a diagram of an example process 700 for decrypting an electronic message according to one or more implementations described herein. In one or more implementations, process 700 may be performed by one or more components of user device 210. In other implementations, some or all of process 700 may be performed by one or more other components/devices, or a group of components/devices, including or excluding user device 210. For example, message security system may perform some or all of process 700

An electronic message may be received (block 710). For example, user device 210 may receive an electronic message from another user device 210. In some implementations, the electronic message may have been encrypted using a security key corresponding to one or more user inputs. As mentioned above, examples of such a user input may include a user moving or gyrating user device 210 in a particular pattern, the user speaking into a microphone of user device 210, the user typing a sequence of characters into a keyboard of user device 210, or the user specifying optical information (e.g., facial recognition data), etc.

Personalized security key information may be received (block 720). For instance, user device 210 may receive personalized security key information from a user. In some implementations, user device 210 may prompt the user for the personalized security key information. Examples of personalized security key information may include the same type of information received from the user of the sending user device 210 to create the personalized security key used to encrypt the electronic message. For instance, if the sending user device 210 used a user device gyration pattern to create a personalized security key and encrypt the electronic message, the personalized security key information received by the receiving user device 210 may be the same user device gyration pattern. In other implementations, the personalized security key information may be a set of information that is complementary or otherwise associated with the information received by the sending user device 210. For example, if the sending user device 210 used a circular user device gyration pattern to create the personalized security key and encrypt the electronic message, the personalized security key information received by the receiving user device 210 may be a linear user device gyration pattern. Information specifying the appropriate types of user inputs for encrypting the electronic message and information specifying the appropriate types of user inputs for decrypting the electronic message may be stored by the sending user device 210, stored by message security system 230, and/or received by the receiving use device 210. In other implementations, the personalized security key information may be one or more types of information identifying the user of the receiving user device 210, such as a user name, a password, an e-mail address, or another type of information identifying the user of the receiving user device 210.

A personalized security key may be obtained (block 730). For example, user device 210 may obtain a personalized security key for decrypting the electronic message. The personalized security key may be the personalized security key used to encrypt the electronic message. In some implementations, user device 210 may obtain the personalized security key by generating the personalized security key based on the personalized security key information received from the user. In other implementations, user device 210 may obtain the personalized security key be communicating with the sending user device 210 and/or message security system 230. For example, the receiving user device 210 may communicate the personalized security key information to the sending user device 210, and the sending user device 210 may authenticate the receiving user device 210 (or the user of the receiving user device 210) and communicate the personalized security key to the receiving user device 210. Similarly, the receiving user device 210 may communicate the personalized security key information to message security system 230, and message security system 230 may authenticate the receiving user device 210 (or the user of the receiving user device 210) and communicate the personalized security key to the receiving user device 210.

A key duration of the personalized security key may be verified (block 740). For instance, user device 210 may determine whether a key duration corresponding to the personalized security key has expired. As mentioned above with reference to FIG. 6, the sending user device 210 may specify a key duration for a personalized security key. The key duration may identify a period of time when the personalized security key may be used to decrypt the electronic message. As such, the receiving user device 210 may verify that the key duration corresponding to a personalized security key has not expired at some point prior to using the personalized security key to decrypt the electronic message. In some implementations, if the key duration has expired, the receiving user device 210 may be prohibited from using the personalized security key to decrypt or otherwise access the electronic message. In some implementations, the key duration of the personalized security key may be verified by the sending user device 210 and/or message security system 230, and, if the key duration has expired, the sending user device 210 and/or message security system 230 may refuse to send the personalized security key to user the receiving user device 210.

The electronic message may be decrypted with the personalized security key (block 750). For instance, user device 210 may use the personalized security key to decrypt the electronic message. As mentioned above, the personalized security key may be generated by user device 210 locally, received from the sending user device 210, or received from message security system 230. In some implementations, however, once the key duration of the personalized security key has expired, the receiving the electronic message may not be decrypted or otherwise viewed (even if the electronic message was previously decrypted by the receiving user device 210).

While FIG. 7 shows a flowchart diagram of an example process 700 for decrypting an electronic message, in other implementations, a process for decrypting an electronic message may include fewer operations, different operations, differently arranged operations, or additional operations than depicted in FIG. 7.

Figure 8:
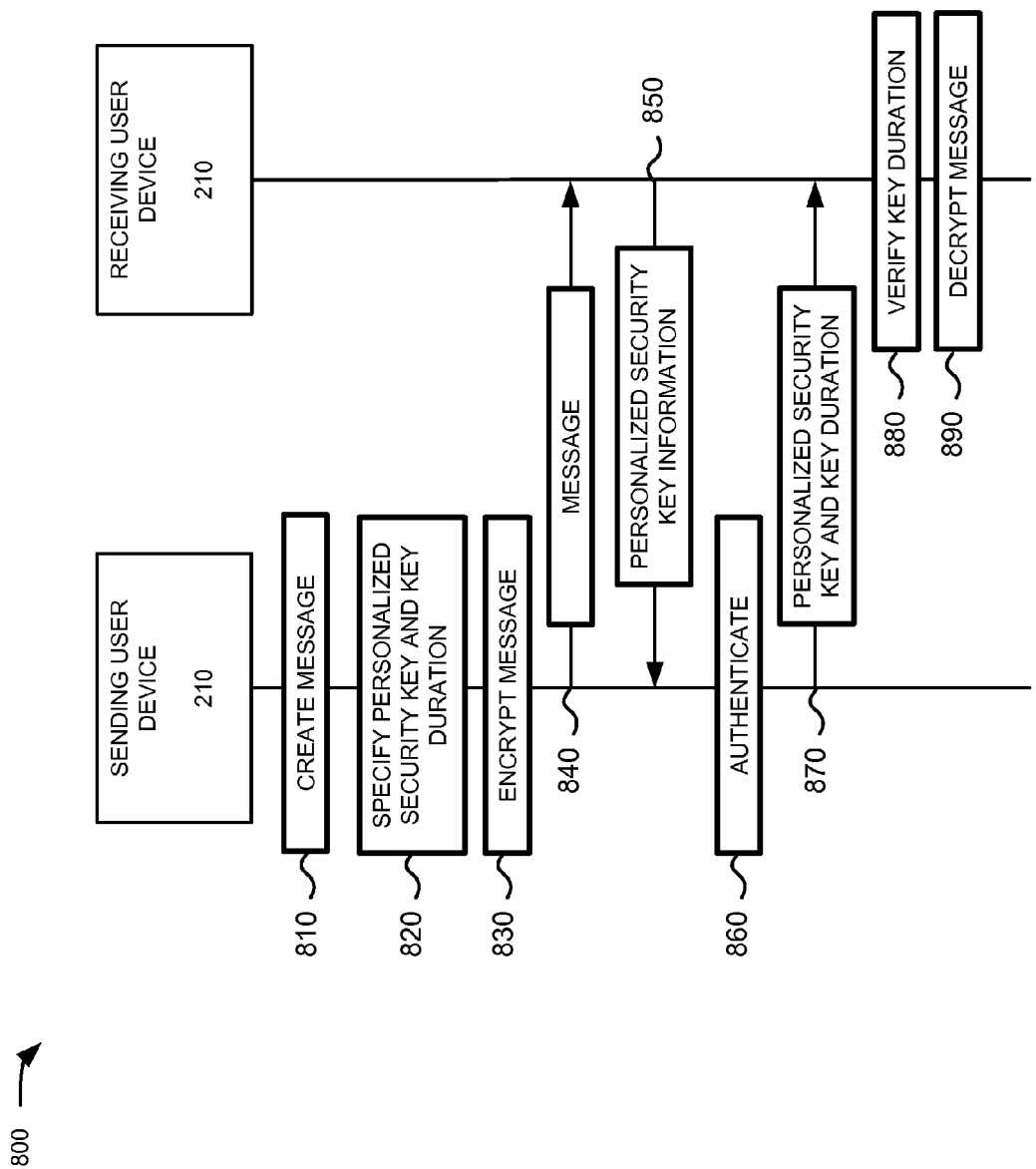
FIG. 8 is a diagram of an example process for communicating an electronic message according to one or more implementations described herein.

FIG. 8 is a diagram of an example process 800 for communicating an electronic message according to one or more implementations described herein. As depicted, sending user device 210 may create an electronic message (event 810). Sending user device 210 may also specify a personalized security key and a key duration for the electronic message (event 820). Sending user device 210 may then encrypt the electronic message using the personalized security key (event 830) and communicate the electronic message to receiving user device 210 (event 840).

Receiving user device 210 may communicate personalized security key information to the sending user device (event 850), and the sending user device may authenticate 860 the personalized security key information (event 860). Sending user device 210 may communicate the personalized security key and the key duration to receiving user device 210 (event 870), and receiving user device 210 may verify that the key duration has not expired (event 880) and proceed to decrypt the electronic message (event 890). In some implementations, sending user device 210 may determine whether the key duration has expired and, if the key duration has expired, may refuse to provide receiving user device 210 with the personalized security key. In some implementations, however, once the key duration of the personalized security key has expired, the receiving the electronic message may not be decrypted or otherwise viewed (even if the electronic message was previously decrypted by the receiving user device 210). In some implementations, if the key duration has expired, in some implementations, user device 210 may prohibit the security key from being used to decrypt the electronic message, delete the security key, re-encrypt the electronic message with another security key, delete the electronic message, or generate a password, associate the password with the electronic message, and require the user to enter the password in order to gain access to the content of the electronic message.

While FIG. 8 shows a flowchart diagram of an example process 800 for communicating an electronic message, in other implementations, a process for communicating an electronic message may include fewer operations, different operations, differently arranged operations, or additional operations than depicted in FIG. 8.

FIG. 9 is a diagram of another example process 900 for communicating an electronic message according to one or more implementations described herein. As depicted, sending user device 210 may create an electronic message (event 910). Sending user device 210 may also, or alternatively, specify a personalized security key and key duration corresponding to the electronic message (event 920). Sending user device 210 may communicate the personalized security key and the key duration to secure message system 230 (event 930). Additionally, or alternatively, sending user device 210 may encrypt the electronic message (event 940) and communicate the electronic message to receiving user device 210 (event 950).

Receiving user device 210 may communicate personalized security key information to secure message system 230 (event 960), and secure message system 230 may authenticate receiving user device 210 based on the personalized security key information (event 970). Secure message system 230 may also, or alternatively, communicate the personalized security key and/or the key duration to receiving user device 210 (event 980). Receiving user device 210 may verify that the key duration has not expired (event 990) and decrypt the electronic message using the personalized security key (event 995). In some implementations, if the key duration has expired, receiving user device 210 may be prohibited from decrypting the electronic message.

While FIG. 9 shows a flow diagram of an example process 900 for communicating an electronic message, in other implementations, a process for communicating an electronic message may include fewer operations, different operations, differently arranged operations, or additional operations than depicted in FIG. 9.

Accordingly, implementations described herein provide solutions for enhancing the security of electronic messages. For instance, implementations described herein may enable users to encrypt electronic messages using personalized security keys that may correspond to a particular type of user input (e.g., user device gyrations, audio inputs, visual inputs, optical data, etc.). Additionally, or alternatively, implementations described herein may enable users to specify the actual contents of the personalized security key (e.g., a particular gyration pattern, a particular phrase or word, etc.). In addition, implementations described herein may enable users to impose timing constraints on decrypting or viewing the contents of an electronic message.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain implementations may involve a component that performs one or more functions. These components may include hardware, such as an ASIC or a FPGA, or a combination of hardware and software.

Even though particular combinations of features are recited in the claims and/or disclosed in the specification, these combinations are not intended to limit disclosure of the possible implementations. In fact, many of these features may be combined in ways not specifically recited in the claims and/or disclosed in the specification. Although each dependent claim listed below may directly depend on only one other claim, the disclosure of the implementations includes each dependent claim 1n combination with every other claim 1n the claim set.

No element, act, or instruction used in the present application should be construed as critical or essential to the implementations unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   creating, by a user device, an electronic message, the electronic message comprising destination information corresponding to an intended recipient of the electronic message;
   specifying, by a user device, a security key corresponding to the intended recipient and a key duration corresponding to the security key,
   encrypting, by the user device, the electronic message based on the security key corresponding to the intended recipient;
   sending, by the user device, the electronic message based on the destination information to the intended recipient;
   receiving security key information from a device corresponding to the intended recipient;
   determining that the received security key information corresponds to the security key;
   authenticating the security key information when the received security key information corresponds to the security key; and
   in response to authenticating the security key information, communicating the security key and the key duration to the device corresponding to the intended recipient,
   wherein the key duration indicates an interval of time, and
   wherein expiration of the interval of time renders the security key inoperative for decrypting the electronic message.

2. The method of claim 1, further comprising:
   determining whether authentication information included in the security key information corresponds to the intended recipient;
   in response to determining that the authentication information does not correspond to the intended recipient, disregarding the security key information.

3. The method of claim 2, where:
   the authentication information in the security key information corresponds to the security key used to encrypt the electronic message, and
   determining whether the authentication information corresponds to the intended recipient comprises:
      determining whether the authentication information corresponds to the security key.

4. The method of claim 1, further comprising:
   prompting the user to input the security key; and
   receiving the security key from the user.

5. The method of claim 1, further comprising:
   providing the user with a menu of security key types;
   prompting the user to select a security key type from the menu of security key types;
   receiving a selection, from the user, corresponding to a particular security key type;
   receiving, from the user, security key information corresponding to the particular security key type; and
   generating the security key based on the security key information received from the user.

6. The method of claim 5, where:
   the selected security key type comprises:
      audio information,
      facial recognition information,
      user device gyration information, or
      text pattern information, and
   the security key information comprises:
   audio information originating from the user,
      facial recognition information corresponding to the user,
      facial recognition information corresponding to an intended recipient of the electronic message,
      gyration pattern information corresponding to a user manually moving the user device according to a particular gyration pattern, or
      password information corresponding to a pattern of text received from the user.

7. The method of claim 1, further comprising:
   receiving the key duration from the user;
   associating the key duration with the security key; and
   storing the key duration for subsequent use.

8. The method of claim 1, further comprising:
   in response to communicating the electronic message to the intended recipient,
      receiving a security key request from a device corresponding to the intended recipient;
      determining whether the key duration, associated with the security key, has expired;
      when the key duration, associated with the security key, has not expired,
         communicating the security key to the device corresponding to the intended recipient; and
      when the key duration, associated with the security key, has expired,
         disregarding the security key request.

9. The method of claim 1, wherein specifying, by a user device, a security key corresponding to the intended recipient and a key duration corresponding to the security key further comprises:
   receiving, by the user device and from a user, the security key corresponding to a particular type of user input and corresponding to the intended recipient of the electronic message.

10. A user device, comprising:
    a memory to store instructions; and
    a processor, connected to the memory, to:
       receive an electronic message, where the electronic message is encrypted with a security key corresponding to a user of the user device;
       prompt the user of the user device to input security key information, where the security key information comprises authentication information corresponding to the electronic message;
       receive the authentication information from the user of the user device, where the authentication information corresponds to the security key used to encrypt the electronic message;
       authenticate the authentication information;
       receive a security key following the authentication;

identify a key duration associated with the electronic message, where the key duration comprises an interval of time during which the security key is to be used to decrypt the electronic message,
determine whether the key duration has expired;
when the key duration has not expired,
    decrypt the electronic message using the security key; and
when the key duration has expired,
    prohibit content corresponding to the electronic message from being displayed to the user of the user device.

11. The user device of claim 10, where the security key is based on the authentication information received from the user of the user device.

12. The user device of claim 11, where:
the electronic message is received from another user device, and
to obtain the security key, the processor is to:
    communicate a security key request to the other user device, where the security key request comprises the authentication information received from the user, and
    receive the security key in response to communicating the security request to the other user device.

13. The user device of claim 10, where, to prohibit content, corresponding to the electronic message, from being displayed to the user of the user device, the processor is to:
prohibit the security key from being used to decrypt the electronic message,
delete the security key,
re-encrypt the electronic message with another security key, and
delete the electronic message, or
generate a password,
associate the password with the electronic message, and
require the user to enter the password in order to gain access to the content of the electronic message.

14. One or more non-transitory computer-readable storage media, comprising:
one or more instructions that, when executed by a processor of a user device, cause the processor to:
    create an electronic message in response to receiving one or more inputs from a user, where the electronic message comprises destination information corresponding to an intended recipient of the electronic message;
    receive, from the user, a security key corresponding to the intended recipient of the electronic message;
    encrypt the electronic message based on the security key;
    associate a key duration, received from the user, with the security key, where the key duration comprises a time interval in which using the security key to decrypt the electronic message effects a successful decryption of the electronic message and outside of which the security key is inoperative for decrypting the electronic message;
    send the electronic message based on the destination information to the intended recipient;
    receive security key information from a device corresponding to the intended recipient;
    determine whether the received security key information corresponds to the security key;
    authenticate the security key information when the received security key information corresponds to the security key; and
    in response to authenticating the security key information communicate the security key and the key duration to the device corresponding to the intended recipient.

15. The non-transitory computer-readable storage media of claim 14, further comprising one or more instructions that, when executed by a processor, cause the processor to:
when the authentication information does not correspond to the intended recipient,
    disregard the security key information.

16. The non-transitory computer-readable storage media of claim 15, where:
the authentication information corresponding to the security key information corresponds to security used to encrypt the electronic message, and
determining whether the authentication information corresponds to the intended recipient comprises:
    determining whether the authentication information corresponds to the security key.

17. The non-transitory computer-readable storage media of claim 14, further comprising one or more instructions that, when executed by a processor, cause the processor to:
prompt the user to input the security key; and
receive the security key from the user.

18. The non-transitory computer-readable storage media of claim 14, further comprising one or more instructions that, when executed by a processor, cause the processor to:
provide the user with a menu of security key types;
prompt the user to select a security key type from the menu of security key types;
receive a selection, from the user, corresponding to a particular security key type;
receive, from the user, security key information corresponding to the particular security key type from the menu of security key types; and
generate the security key based on the security key information received from the user.

19. The non-transitory computer-readable storage media of claim 18, where:
the selected security key type comprises:
    audio information,
    facial recognition information,
    user device gyration information, or
    text pattern information, and
the security key information comprises:
    audio information originating from the user,
    facial recognition information corresponding to the user,
    facial recognition information corresponding to an intended recipient of the electronic message,
    gyration pattern information corresponding to a user manually moving the user device according to a particular gyration pattern, or
    password information corresponding to a pattern of text received from the user.

20. The computer-readable storage media of claim 14, further comprising one or more instructions that, when executed by a processor, cause the processor to:
in response to communicating the electronic message to the intended recipient,
receiving a security key request from a device corresponding to the intended recipient;
determining whether the key duration associated with the security key has expired;
when the key duration associated with the security key has not expired,
    communicate the security key to the device corresponding to the intended recipient; and when the key duration associated with the security key has expired,
 disregard the security key request.

* * * * *